(12) United States Patent
Nunez et al.

(10) Patent No.: US 12,176,698 B2
(45) Date of Patent: Dec. 24, 2024

(54) CABLE HOLDER, STACK OF CABLE HOLDERS AND FIXATION ARRANGEMENT

(71) Applicant: Rosenberger Hochfrequenztechnik GmbH & Co. KG, Fridolfing (DE)

(72) Inventors: Heath Nunez, Bell City, LA (US); Hernan Pablo Madera, Miami, FL (US)

(73) Assignee: Rosenberger Hochfrequenztechnik GmbH & Co KG, Fridolfing (DE)

( * ) Notice: Subject to any disclaimer, the term of this patent is extended or adjusted under 35 U.S.C. 154(b) by 0 days.

(21) Appl. No.: 17/866,696

(22) Filed: Jul. 18, 2022

(65) Prior Publication Data

US 2024/0022056 A1 Jan. 18, 2024

(51) Int. Cl.
*H02G 3/32* (2006.01)
*F16L 3/22* (2006.01)
*F16L 3/04* (2006.01)
*F16L 3/06* (2006.01)
*F16L 3/13* (2006.01)
*F16L 3/237* (2006.01)

(52) U.S. Cl.
CPC .................. *H02G 3/32* (2013.01); *F16L 3/22* (2013.01); *F16L 3/04* (2013.01); *F16L 3/06* (2013.01); *F16L 3/13* (2013.01); *F16L 3/237* (2013.01)

(58) Field of Classification Search
CPC . H02G 3/32; H02G 3/04; B64C 1/403; B64D 15/00; B64D 15/20; F16L 3/123; F16L 3/1025; F16L 3/1091; F16L 3/06; F16L 3/1075; F16L 3/22; F16L 3/222; F16L 3/237; A01K 97/08
See application file for complete search history.

(56) References Cited

U.S. PATENT DOCUMENTS

| 5,815,894 | A | * | 10/1998 | Soriano | ................. | A01K 97/08 |
| | | | | | | 24/297 |
| 6,892,990 | B2 | | 5/2005 | Pisczak | | |
| 7,614,593 | B2 | | 11/2009 | McClure et al. | | |
| 9,810,021 | B2 | | 11/2017 | Sylvester et al. | | |
| 10,948,107 | B2 | | 3/2021 | Vacarro | | |
| 2008/0093510 | A1 | * | 4/2008 | Oh | ........................ | F16L 3/2235 |
| | | | | | | 248/63 |
| 2013/0001373 | A1 | | 1/2013 | Ogawa | | |

(Continued)

FOREIGN PATENT DOCUMENTS

CN 100344904 C 10/2007
CN 205595719 U 9/2016

(Continued)

*Primary Examiner* — Tan Le
(74) *Attorney, Agent, or Firm* — Donald S. Showalter; GrayRobinson, P.A.

(57) ABSTRACT

A cable holder may include a first housing shell, a second housing shell, and a hinge connecting the first housing shell to the second housing shell pivotably between an open position and a closed position and may further include a first connection element for making connection to a second connection element of a second cable holder. The second connection element is preferably at least substantially a negative shape of the first connection element, such that the first connection element and the second connection element may establish a linear-motion bearing with the respective counterpart.

17 Claims, 5 Drawing Sheets

(56) References Cited

U.S. PATENT DOCUMENTS

2016/0281881 A1\* 9/2016 Vaccaro .............. G09F 15/0062
2017/0146154 A1\* 5/2017 Tally ..................... F16L 3/1075
2018/0266587 A1   9/2018 Booth et al.
2020/0041039 A1\* 2/2020 Varale ....................... F16L 3/13
2020/0158263 A1\* 5/2020 Kim ..................... F16L 3/1083

FOREIGN PATENT DOCUMENTS

| DE | 19856945 C1    |   | 6/2000  |           |
|----|----------------|---|---------|-----------|
| EP | 2397736 A1     |   | 12/2011 |           |
| EP | 3771853 A1     | * | 2/2021  | ............... F16L 3/13 |
| KR | 20180040872 A  | * | 4/2018  |           |
| WO | 2013050064 A1  |   | 4/2013  |           |

\* cited by examiner

CABLE HOLDER, STACK OF CABLE HOLDERS AND FIXATION ARRANGEMENT

FIELD OF THE INVENTION

The invention relates to the field of cable holders for securing and supporting cables along elongated structural members. More particularly, one aspect of the present invention relates to a first cable holder, comprising a first housing shell, a second housing shell and a hinge connecting the first housing shell being pivotable to the second housing shell.

A further aspect of the invention relates to a stack of a first cable holder and at least a second cable holder, each of said cable holders comprising a first housing shell, a second housing shell and a hinge connecting the first housing shell being pivotable to the second housing shell.

Yet a further aspect of the invention relates to a fixation arrangement with a structural member, at least one first cable holder, and an attachment strap, the at least one first cable holder comprising a first housing shell, a second housing shell and a hinge connecting the first housing shell being pivotable to the second housing shell, the attachment strap attaching the at least one first cable holder to the structural member.

BACKGROUND OF THE INVENTION

Cable holders (also known as "cable hangers" or "cable clamps") are commonly used to secure cables to structural members, such as pipes, of antenna towers and/or along tunnel walls. Generally, each cable is attached to the pipe by cable holders mounted at periodically-spaced attachment points of the pipe.

To conserve space, it can be desirable to attach several cables to the same attachment point. Therefore, certain cable holders have been constructed to secure multiple cables; other cable holders have a stackable construction that permits multiple cable holders to be interlocked. Stacked and multiple-cable-type cable holders significantly increase the number of cables mountable to a single attachment point.

In case of a change of a single cable, handling of the other cables of a multi-cable-type cable holder can be difficult, as the mechanical condition of the other cables in the cable holder can become insecure, while the cable holder is in its open state to provide access to the respective cable.

U.S. Pat. No. 10,948,107 B2 suggests to use stackable cable clamps, wherein each cable clamp offers space for two cables. The cable clamps can be connected to other cable clamps such that, in the stacked condition, a single cable clamp can be opened to get access to its cables, while the other cable clamps may still remain in their closed state to keep the other cables captively accommodated. However, the stacking mechanism of U.S. Pat. No. 10,948,107 B2 is difficult to manufacture, uncomfortable to be handled by the technician in field, and also mechanically prone to material failure.

BRIEF SUMMARY OF THE INVENTION

The present invention is based on the object of providing stackable cable holders for at least one cable or at least one grommet, which can be manufactured easily and is in particular less prone to material fatigue during continuous operation.

The present invention is also based on the object of providing a stack of a first cable holder and at least a second cable holder, each cable holder can receive at least one cable or at least one grommet, and each cable holder can be manufactured easily and is in particular less prone to material fatigue during continuous operation.

The invention is further based on the object of providing an advantageous fixation arrangement with a structural member, e. g., a pipe of an antenna tower, and at least one first cable holder for at least one cable or at least one grommet, which can be manufactured easily and is in particular less prone to material fatigue during continuous operation.

Provided according to the invention is a first cable holder, comprising: a first housing shell; a second housing shell; a hinge connecting the first housing shell to the second housing shell being pivotable between an open position, in which a cable or a grommet can be inserted between the first and the second housing shell, and a closed position, in which the cable or the grommet is captively accommodated between the first and the second housing shell; and a first connection element for making connection or being operable to make a connection to a second connection element of a second cable holder. The second connection element is at least substantially a negative shape of the first connection element, such that the first connection element and the second connection element may establish a linear-motion bearing with the respective counterpart.

It may be provided that the first cable holder further comprises a second connection element for making connection or being operable to make a connection to a first connection element of a third cable holder.

Note that according to the common definition, positive shapes represent solid objects and negative shapes the space around solid object. Thus, said "negative shape" of the second connection elements is to be understood as a shape enveloping the positive shape of the first connection element, such that the first connection element can be inserted slidably into the second connection element to establish the linear-motion bearing. Also note that the shape of the second connection element does not have to be an ideal negative shape of the first connection element—the term "substantially" is to be understood such that there may remain some space between the connected shapes/the connection elements, e. g., in order to reduce friction during motion. The negative shape of the second connection element may also comprise openings, e. g., a groove along the slide direction of the linear-motion bearing. For example, the linear-motion bearing/the connection elements may form a dovetail-like or a similar interlocked connection, within the definition "substantially a negative shape".

Consequently, a cable can be removed from the first cable holder by individually opening the first cable holder without disassembling the connection of the first cable holder to another/the second/the third cable holder. Thus, every cable can remain safely accommodated in its respective cable holder, although individual cables can be accessed. In addition, the linear-motion bearing provides an easy and comfortable way to connect several cable holders in a mechanical robust and durable manner.

The second cable holder and the third cable holder may also be referred to as "other cable holders" below and may be of the same type/may comprise the same functional and/or structural features as the first cable holder.

It may be provided that the first and the second housing shell are separate elements. It may also be provided that the first and the second housing shell are monolithically, and are connected through an integral film hinge.

It may be provided that the first and the second housing shell are at least partly or entirely made of dielectric material, e. g., plastic. Especially the inner parts of said housing shells can be made of dielectric material. It may also be provided that the first and the second housing shell contain an electrically conductive material, or are entirely made of an electrically conductive material, such as metal (e. g., copper, steel, aluminium, or the like).

It may be provided that the hinge comprises a first hinge part and a second hinge part. Preferably, the first hinge part is formed monolithically from the first housing shell and the second hinge part is formed monolithically from the second housing shell. It can be provided that said housing shells can be separated from each other by disassembling the respective hinge parts.

It may be provided that the first hinge part is a swivel pin and the second hinge part is a pivot bearing for the swivel pin. However, also alternative types of hinges can be provided.

It may be provided that the pivot bearing has a guiding protrusion for the swivel pin, which is designed such that the swivel pin can snap into the pivot bearing. The swivel pin can thus be captively accommodated in the pivot bearing.

It may be provided that the first hinge part further comprises a supporting surface facing the swivel pin, and the second hinge part further comprises a curved bearing surface running around the pivot bearing for guiding the supporting surface along a rotary direction of the hinge.

It may be provided that the supporting surface is spaced from the curved bearing surface, at least in the open position of the first and second housing shell, such that the swivel pin can be removed from the pivot bearing at least in said open position. In can also be provided that the supporting surface and the curved bearing surface run closely adjacent on each other, at least in the closed position of the first and second housing shell, such that the swivel pin cannot be removed from the pivot bearing at least in said closed position.

It may be provided that at least one of the first housing shell or the second housing shell has an elastic element for clamping the cable or the grommet in the first cable holder in the closed position of the first and second housing shell.

It may be provided that the first cable holder further comprises a latching arrangement for latching the first and second housing shell in the closed position. The latching arrangement may comprise a first latch element and a second latch element. The first latch element may be monolithically formed from the first housing shell and the second latch element may be monolithically formed from the second housing shell.

It may be provided that the first latch element or the second latch element is a snap-in hook and the respective other latch element is a recess for the snap-in hook.

It may be provided that the recess for the snap-in hook has an acute-angled tip. It may also be provided that the snap-in hook has an inner acute angle for latching behind an edge of the recess, e. g., behind said acute-angled tip of the recess.

It may be provided that the latching arrangement comprises a guide for guiding said first and second latch elements into a latched state. The guide may have an elongated protrusion running along an outer shell surface of the first housing shell and a corresponding elongated groove running around an outer shell surface of the second housing shell. It may also be provided that the outer shell surface of the second housing shell comprises the elongated protrusion and the outer shell surface of the first housing shell comprises the elongated groove.

It may be provided that the first connection element protrudes from the first housing shell and the second connection element is designed as a recess in the second housing shell—or vice versa.

It may be provided that the first connection element and the second connection element are arranged on opposite sides of the first cable holder. The first and second connection element may also be arranged on adjacent sides of the first cable holder or even on the same side for realizing a branching first cable holder, e. g., a T-like/tree-like structure.

It may be provided that the first connection element is arranged on the first housing shell and the second connection element is arranged on the second housing shell. The first and the second connection element may also be arranged on the same housing shell (first housing shell or second housing shell) for realizing a branching first cable holder, e. g., a T-like/tree-like structure.

It may be provided that a slide direction of the linear-motion bearing is oriented parallel or at least substantially parallel (e. g., at an angle of <10°, preferably <5°, most preferably <2°) to a rotation axis of the hinge.

It may be provided that the first connection element has a first stop surface and the second connection element has a second stop surface to realize a mechanical end stop of the linear-motion bearing, especially in a vertical orientation of the linear-motion bearing.

It may be provided that the at least one of, the first connection element or the second connection element has a wedge-like, sloping course, e. g., a groove that tapers in the insertion/guiding direction of the linear-motion bearing, such that the insertion depth of the first connection element in the second connection element is limited.

It may be provided that the first connection element comprises a first snap coupling part and the second connection element comprises a corresponding second snap coupling part, such that the first connection element and the second connection element may establish a snap coupling with the respective counterpart.

A single cable holder according to the invention can provide a single clamping space to accommodate a single cable or a single grommet, but may also comprise a plurality of clamping spaces to accommodate a plurality of cables and/or grommets.

The invention also relates to a stack of a first cable holder and at least a second cable holder, each of said cable holders comprising: a first housing shell; a second housing shell; a hinge connecting the first housing shell to the second housing shell being pivotable between an open position, in which a cable or a grommet can be inserted between the first and the second housing shell, and a closed position, in which the cable or the grommet is captively accommodated between the first and the second housing shell; a first connection element making connection or being operable to make a connection to a second connection element of one of said respective other cable holders of said stack; and a second connection element for making connection or being operable to make a connection to a first connection element of one of said respective other cable holders of said stack; the second connection element is at least substantially a negative shape of the first connection element, such that the first connection element and the second connection element establish a linear-motion bearing with the respective counterpart.

In said stack of cable holders, the first cable holder may for example be connected to the second cable holder only, to the third cable holder only, to the second cable holder and the third cable holder (e. g., between the second cable holder and the third cable holder), or to any other cable holders directly or indirectly with other cable holders in between.

It may be provided that the position of the hinges of all respective cable holders of said stack of cable holders is arranged on the same side. This is especially preferred if common parts shall be provided (i. e., all cable holders are structurally and/or functionally similar or identical). It may also be provided that the position of the hinges differs between the cable holders in said stack of cable holders (for example, an alternating position).

The invention further relates to a fixation arrangement with a structural member, at least one first cable holder, and an attachment strap, the at least one first cable holder comprising: a first housing shell; a second housing shell; a hinge connecting the first housing shell to the second housing shell being pivotable between an open position, in which a cable or a grommet can be inserted between the first and the second housing shell, and a closed position, in which the cable or the grommet is captively accommodated between the first and the second housing shell; a first connection element for making connection or being operable to make a connection to a second connection element of a second cable holder; and at least one attachment point or attachment slit for the attachment strap; wherein the attachment strap is attached to the at least one first cable holder at the attachment point or attachment slit and attaches the at least one first cable holder to the structural member, and wherein the second connection element is at least substantially a negative shape of the first connection element, such that the first connection element and the second connection element may establish a linear-motion bearing with the respective counterpart.

It may be provided that the fixation arrangement further comprises a second connection element for making connection or being operable to make a connection to a first connection element of a third cable holder.

DETAILED DESCRIPTION

Figure 1:
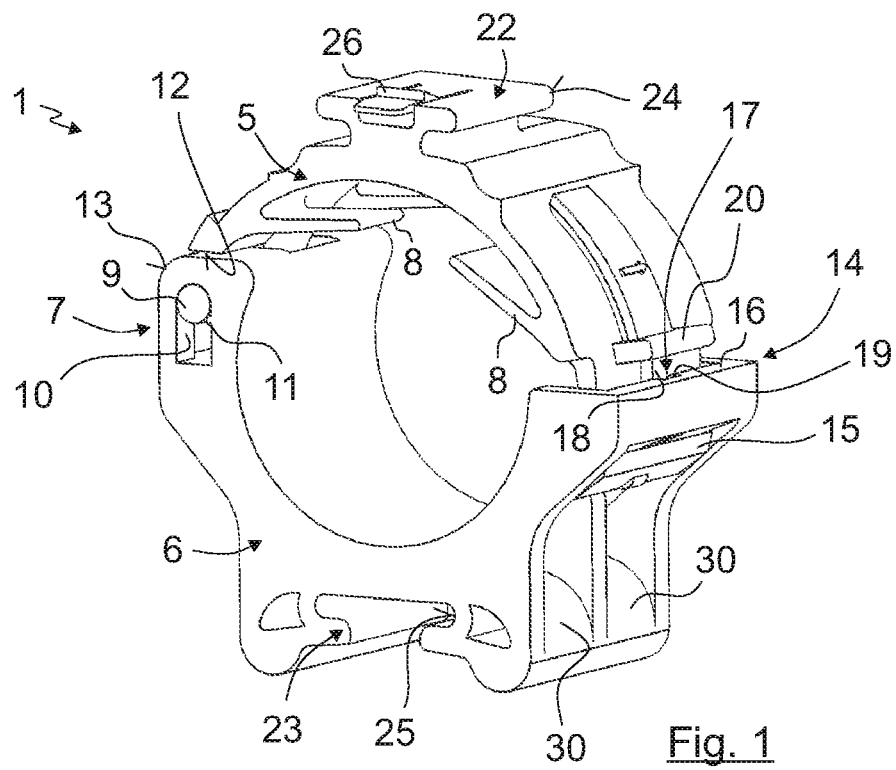
FIG. 1 is a perspective view of an embodiment of a first cable holder according to the invention in a closed position, without accommodating a cable or a grommet.

The present invention is described with reference to the accompanying drawings, in which certain embodiments of the invention are shown. This invention may, however, be embodied in many different forms and should not be construed as limited to the embodiments that are pictured and described herein. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. In addition, it should be noted that terms such as "comprising", "having" or "with" do not exclude other features.

In the Figures of the drawings, elements that are functionally identical are denoted by the same reference labels.

Referring now to the Figures, a first cable holder 1 according to a first embodiment of the invention is shown in FIGS. 1 to 5. The first cable holders 1 according to the invention can be used to fix one or more cables or one or more grommets 2 for one or more cables to a structural member 3, such as a pipe (compare FIG. 7). Using a grommet 2 with one or more channels 4 for one or more cables allows to easily hold multiple combinations of cables of different sizes and types in a mutual first cable holder 1. Although the drawings show the first cable holder 1 holding a single grommet 2 for a plurality of cables, this is not to be understood as a limitation but as an example only.

The first cable holder 1 comprises a first housing shell 5 and a second housing shell 6. Said housing shells 5, 6 are separate elements, being pivotable connected by a hinge 7. Via the hinge 7, the first cable holder 1 can be pivoted into an open position, in which the cable (not shown) or the grommet 2 (see for example FIGS. 2 and 3) can be inserted between the housing shells 5, 6. Although the housing shells 5, 6 in the application examples provide only a single clamping space for a single cable or a grommet 2, the housing shells 5, 6 may also provide a plurality of clamping spaces for accommodating a plurality of cables and/or grommets 2. From the open position, the housing shells 5, 6 can be pivoted into a closed position, in which the cable(s) and/or grommet(s) 2 are captively accommodated in the first cable holder 1 (compare FIG. 2).

The housing shells 5, 6 are preferably made of dielectric material in order to avoid passive intermodulation (PIM). The first cable holder 1 is preferably made of fiber reinforced, Ultra Violet (UV) stable composite material. Note that also first cable holders 1 with electrically conductive housing shells 5, 6 are possible.

In the application examples, the first housing shell 5 comprises four elastic elements 8 (leaf springs) which are distributed over the inner surface for clamping the cable or the grommet 2 in the first cable holder 1 in the closed position. The elastic elements 8 allow for the compensation of production tolerances of the cable or the grommet 2 and make sure that the cable or the grommet 2 is held securely in the first cable holder 1 also under adverse environmental conditions.

The hinge 7 of the first cable holder 1 may comprise a first hinge part 9 which is monolithically formed from the first housing shell 5, and a second hinge part 10 which is monolithically formed from the second housing shell 6. Also a hinge which is separate form the first and/or second housing shell 5, 6 can be possible, as well as a hinge which is monolithically with both housing shells 5, 6 (also known as film hinge). In the application examples, the first hinge part 9 has a swivel pin and the second hinge part 10 has a pivot bearing for the swivel pin. The pivot bearing has an optional guiding protrusion 11 for the swivel pin, which is designed such that the swivel pin can snap into the pivot bearing.

To allow easy disassembling of the housing shells 5, 6 while still ensuring that the housing shells 5, 6 are not separated unintentionally during customary operation of the first cable holder 1, the first hinge part 9 comprises a supporting surface 12 facing the swivel pin, and the second hinge part 10 comprises a curved bearing surface 13 running around the pivot bearing for guiding the supporting surface 12 along the rotary direction of the hinge 7. Said supporting surface 12 is spaced from the curved bearing surface 13 in the open position of the housing shells 5, 6, such that the swivel pin can be removed from the pivot bearing in said open position (compare FIG. 4). However, in the closed position and also in intermediate states of the first cable holder 1 between the open position and the close position the supporting surface 12 and the curved bearing surface 13 run closely adjacent on each other, such that the swivel pin cannot be removed from the pivot bearing at least in said closed position or intermediate states. Another advantage of said curved bearing surface 13 and supporting surface 12 is the mechanical support as such, because the combined weight of the vertically hanging cables can be carried by the first cable holder 1 without the risk of fracture or destruction.

The first cable holder 1 according to the application examples comprises a latching arrangement 14 for latching the housing shells 5, 6 in their closed position. Said latching arrangement 14 comprises a first latch element 15 and a second latch element 16. The first latch element 15 is a snap-in hook and is monolithically formed from the first housing shell 5. The second latch element 16 is a recess for the snap-in hook and is monolithically formed from the second housing shell 6. As can be seen well in FIG. 5, said recess has an acute-angled tip, and the snap-in hook has an inner acute angle for latching behind said acute-angled tip. Using acute angles for the latch elements 15, 16 is advantageous to provide a secure mechanism for preventing unintentional opening of the first cable holder 1, as it will be required to move the first housing shell 5 further downwards against the restoring force of the elastic elements 8 when the latching condition shall be solved.

Figure 3:
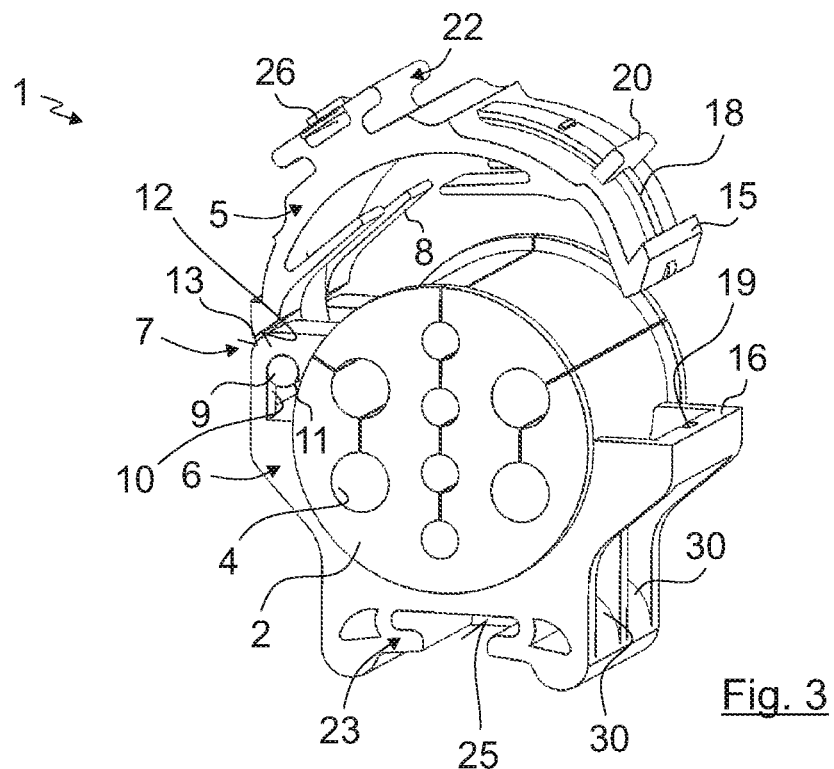
FIG. 3 is another perspective view of the embodiment of FIG. 1 in an open position, with the grommet still being inserted in the second housing shell.

For improved stability and robustness, the latching arrangement 14 comprises a guide 17 for guiding said first and second latch elements 15, 16 into their latched state (compare FIG. 3). The guide 17 has an elongated protrusion 18 running along the outer shell surface of the first housing shell 5 and a corresponding elongated groove 19 running around the outer shell surface of the second housing shell 6.

For improved user comfort, an operating element 20 can be provided, which can be used to conveniently control (open/close) the latching arrangement 14. The operating element 20 can optionally also serve as an end stop of the latching arrangement 14.

Figure 6:
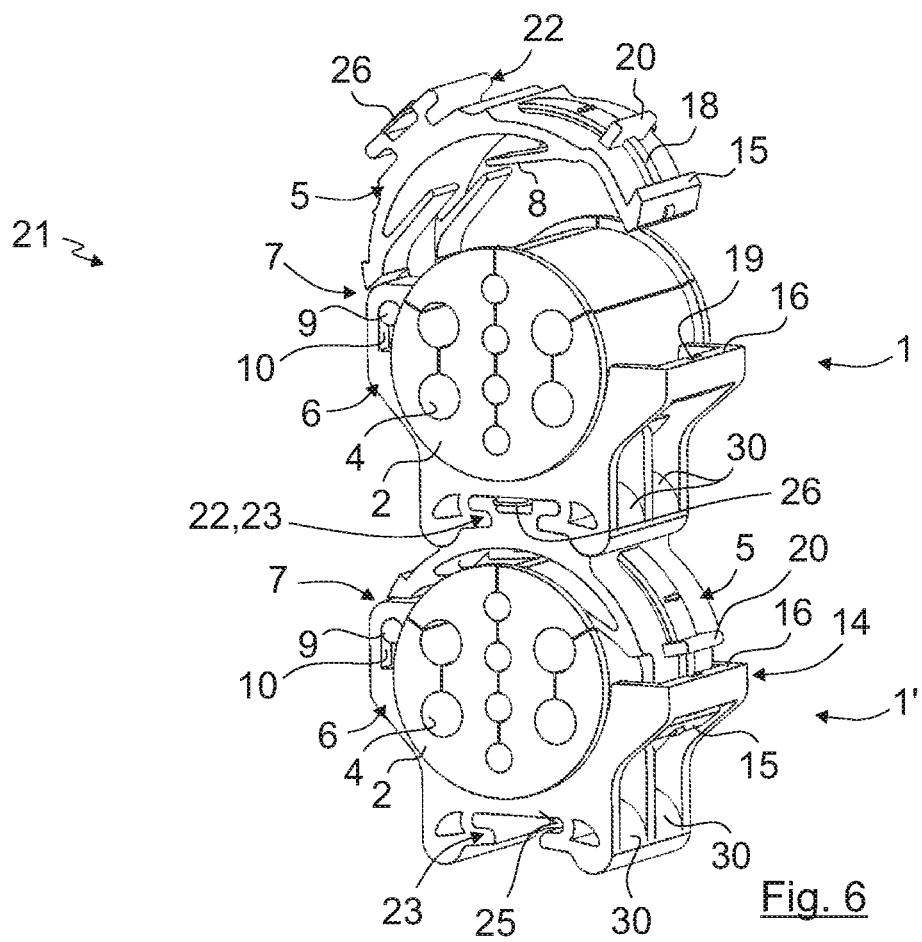
FIG. 6 is a perspective view of an embodiment of a stack of a first and a second cable holder according to the invention in a closed position of the first cable holder and an open position of the second cable holder.

An important aspect of the invention is the possibility to stack a plurality of cable holders 1 (e. g., two or more cable holders 1) such that the individual cable holders 1 can still be opened or closed without the need to disassemble the entire stack 21 or loosen all cables/grommets 2 in the stack 21. An application example of a stack 21 of a first cable holder 1 and a second cable holder 1' is shown in FIG. 6. For connecting said plurality of cable holders 1, 1', each cable holder 1, 1' of the stack 21 comprises a first connection element 22 and a second connection element 23. The first connection element 22 is designed for making connection with the second connection element 23.

In the application examples, the first connection element 22 protrudes monolithically from the first housing shell 5 and the second connection element 23 is designed as recess in the second housing shell 6. Preferably, the first connection element 22 and the second connection element 23 are arranged on opposite sides of the respective cable holder 1, 1'.

The second connection element 23 is at least substantially a negative shape of the first connection element 22, such that the first connection element 22 and the second connection element 23 may establish a linear-motion bearing with the respective counterpart. The slide direction of the linear-motion bearing is oriented at least substantially parallel to the rotation axis of the hinge 7. Using a linear guide for the fixation mechanism between cable holders 1, 1' enables for easy and secure assembly of the stack 21, especially during in-field installation, and allows for stacking and de-stacking without additional tools. Note that easy handling of the cable holders 1, 1' is necessary for the respective technician because the work may have to be performed in high altitudes of an antenna tower or the like. In addition, the linear-motion bearing provides a mechanically highly robust connection of the cable holders 1, 1' and thus can resist high forces.

Figure 7:
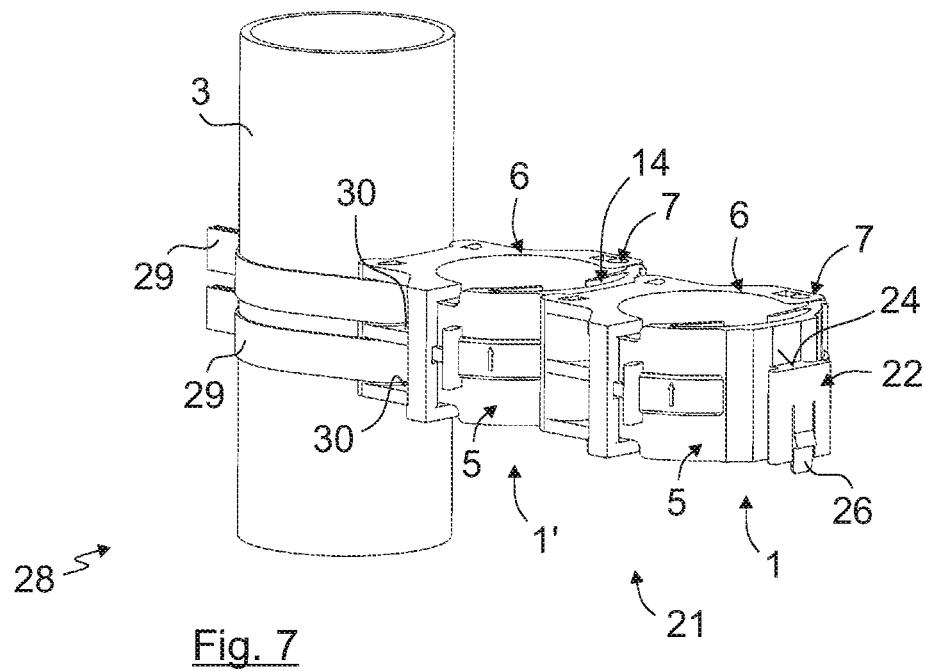
FIG. 7 is a perspective view of an embodiment of a fixation arrangement according to the invention with a stack of cable holders being attached to a structural member with an attachment strap.
Figure 8:
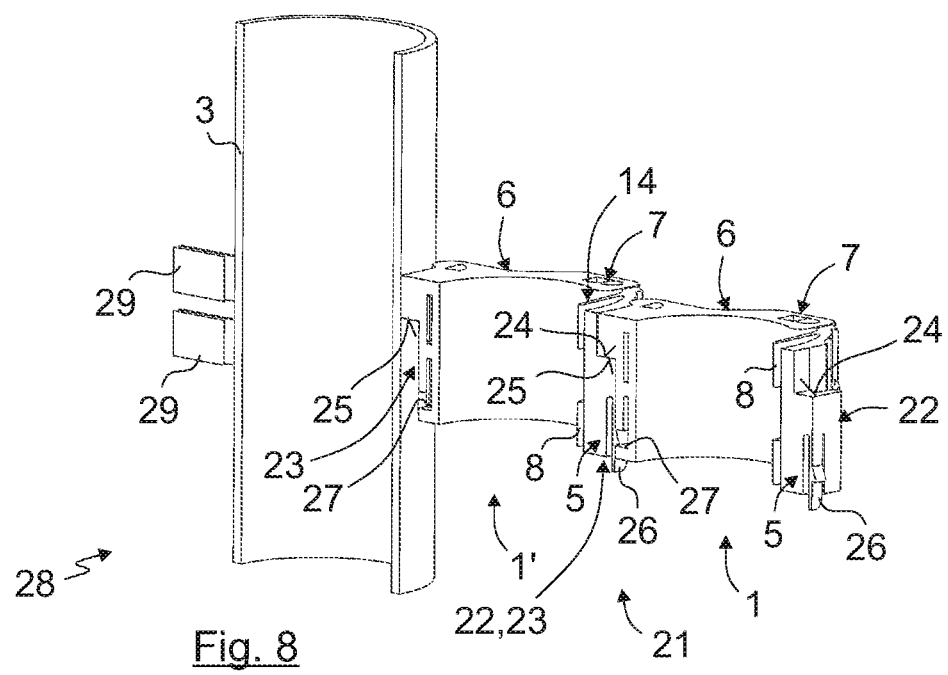
FIG. 8 is a sectional view of the embodiment of FIG. 7 to show further details of its linear-motion bearing.

In order to enhance the mechanical robustness even more, the first connection element 22 may provide a first stop surface 24 and the second connection element 23 may provide a second stop surface 25 to realize a mechanical end stop of the linear-motion bearing, especially in a vertical arrangement of the linear-motion bearing as shown in FIGS. 7 and 8. The end stop can absorb high vertical mechanical forces and ensures that the stack 21 is not separated or damaged, especially in a horizontal arrangement of several cable holders 1, 1' being mounted next to each other, when a corresponding vertical force appears on one of the outer cable holders 1, 1'. FIGS. 7 and 8 show the respective stop surfaces 24, 25 and illustrate the principle very well. The proper mounting orientation may be indicated by arrows engraved on cable holder 1, 1' (e. g., as shown in FIG. 7).

Figure 2:
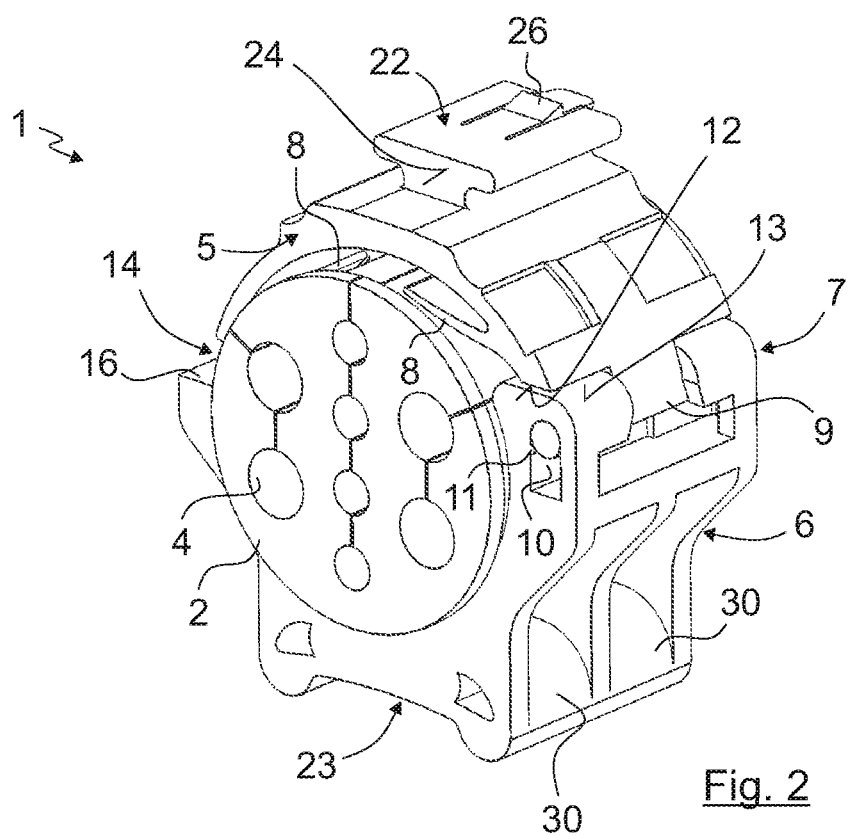
FIG. 2 is another perspective view of the embodiment of FIG. 1 in the closed position, but with a grommet being captively accommodated.
Figure 4:
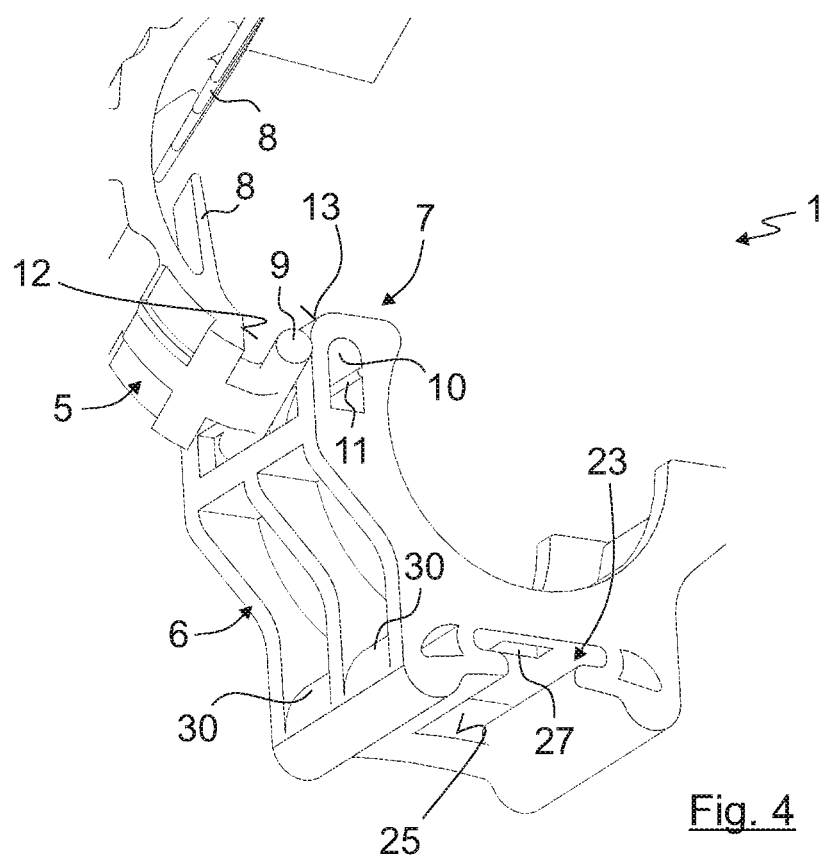
FIG. 4 is an enlarged section of the hinge of the embodiment of FIG. 1 during disassembling of the hinge parts.
Figure 5:
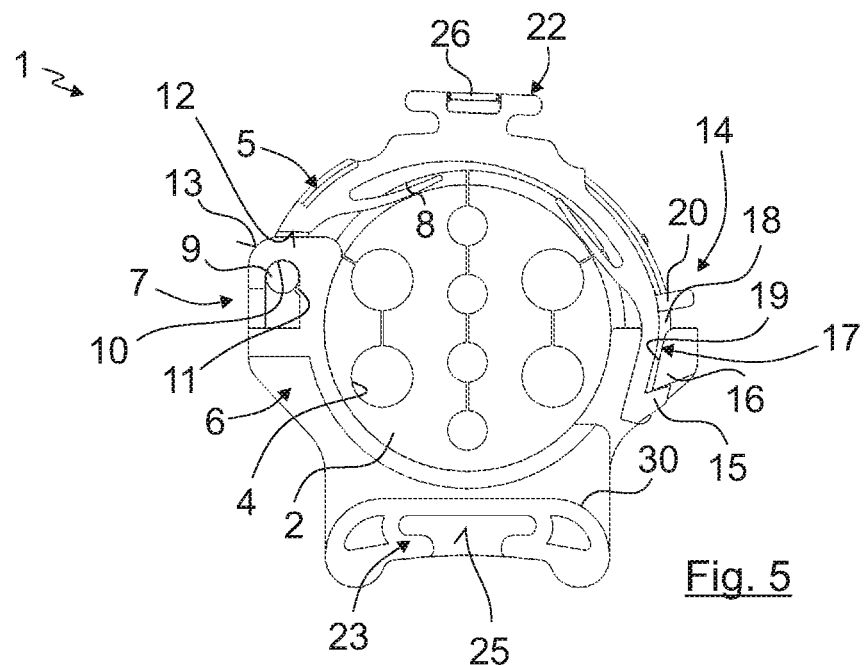
FIG. 5 is a sectional view of the embodiment of FIG. 1 to show further details of its latching arrangement.

In the application examples, the first connection element 22 further comprises a first snap coupling part 26 and the second connection element 23 comprises a corresponding second snap coupling part 27, such that the first connection element 22 and the second connection element 23 may establish a snap coupling with the respective counterpart at the end of the linear-motion bearing (compare FIGS. 2, 4, and 8).

An advantageous application of the invention is to use the cable holders 1, 1' to fix one or more cables along an elongated structural member 3, in particular to a round member/pipe of an antenna tower in order to transmit power and/or data from a base station on the ground to a radio frequency (RF) radio on the top of the tower, e. g., a mobile phone tower. Therefore, the cable holders 1, 1' can hold a single cable or a plurality of cables (individually or held in a mutual grommet 2). The cables may be any type of cables, preferably hybrid cables comprising optical fibers for the transmission of data and electric wires for the transmission of power and/or data.

An application example for a fixation arrangement 28 with the structural member 3 (pipe), a stack 21 of cable holders 1, 1', and attachment straps 29/ribbons is shown in FIGS. 7 and 8. The cable holders 1, 1' comprise at least one attachment point or attachment slit 30 for the attachment straps 29. The attachment straps 29 are attached to at least one of the cable holders 1, 1' of the stack 21 of cable holders 1, 1' at the respective attachment slit 30 and attach the cable holder 1' to the structural member 3. Also other fixation mechanisms, like a snap mechanism or the like, are possible as an alternative to the banding product/attachment strap 29.

Figure 9:
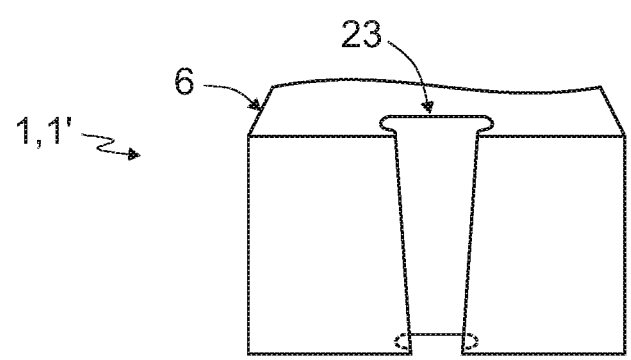
FIG. 9 shows the lower part of a first cable holder according to the invention, providing a wedge-like shape in the second connection element.

FIG. 9 shows the lower part of a first cable holder 1, 1', providing a wedge-like shape in the second connection element 23. Thus, the second connection element 23, and optionally or alternatively also the first connection element 22 (not shown) may provide a sloping course, for example, a groove that tapers in the insertion/guiding direction of the linear-motion bearing, as shown, such that the insertion depth of the first connection element 22 in the second connection element 23 is limited. The wedge-like shape of the linear-motion bearing may replace an end stop, i. e., the stop surfaces 24, 25, as it is able to absorb high mechanical forces as well.

While the invention has been described with reference to various preferred embodiments, it should be understood by those skilled in the art that various changes may be made and equivalents substituted for elements thereof without departing from the scope of the invention. In addition, many modifications may be made to adapt to a particular situation or application of the invention without departing from the scope of the invention. Therefore, it is intended that the invention not be limited to the particular embodiments disclosed but rather, that the invention will include all embodiments falling within the scope of the appended claims, either literally or under the Doctrine of Equivalents.

What is claimed is:

1. A first cable holder, comprising:
a first housing shell;
a second housing shell;
a hinge connecting the first housing shell to the second housing shell being pivotable between an open position, in which a cable or a grommet can be inserted between the first and the second housing shell, and a closed position, in which the cable or the grommet is captively accommodated between the first housing shell and the second housing shell; and
a first connection element for making connection to a second connection element of a second cable holder;
a second connection element for making connection to a first connection element of a third cable holder;
wherein the second connection element is at least substantially a negative shape of the first connection element such that the first connection element and the second connection element may establish a linear-motion bearing with the respective counterpart, wherein the first connection element is arranged on the first housing shell and the second connection element is located on the second housing shell, and wherein at least one of the first housing shell and the second housing shell has an elastic element for clamping the cable or the grommet in the first cable holder in the closed position, the elastic element being in direct contact with the cable or the grommet in the closed position, the elastic element being formed in one piece with at least one of the first housing shell and the second housing shell.

2. The first cable holder as claimed in claim 1, wherein the first and the second housing shell are separate elements.

3. The first cable holder as claimed in claim 1, wherein the hinge comprises a first hinge part and a second hinge part, the first hinge part being monolithically formed from the first housing shell and the second hinge part being monolithically formed from the second housing shell.

4. The first cable holder as claimed in claim 3, wherein the first hinge part is a swivel pin and the second hinge part is a pivot bearing for the swivel pin.

5. The first cable holder as claimed in claim 4, wherein the pivot bearing has a guiding protrusion for the swivel pin, which is designed such that the swivel pin can snap into the pivot bearing.

6. The first cable holder as claimed in claim 4, wherein the first hinge part further comprises a supporting surface facing the swivel pin, and the second hinge part further comprises a curved bearing surface running around the pivot bearing for guiding the supporting surface along a rotary direction of the hinge.

7. The first cable holder as claimed in claim 6, wherein the supporting surface is spaced from the curved bearing surface, at least in the open position of the first and second housing shell, such that the swivel pin can be removed from the pivot bearing at least in said open position, and wherein the supporting surface and the curved bearing surface run closely adjacent on each other, at least in the closed position of the first and second housing shell, such that the swivel pin cannot be removed from the pivot bearing at least in said closed position.

8. The first cable holder as claimed in claim 1, further comprising a latching arrangement for latching the first housing shell and the second housing shell in the closed position, wherein the latching arrangement comprises a first latch element and a second latch element, the first latch element being monolithically formed from the first housing shell and the second latch element being monolithically formed from the second housing shell.

9. The first cable holder as claimed in claim 8, wherein the first latch element or the second latch element is a snap-in hook and the respective other latch element is a recess for the snap-in hook.

10. The first cable holder as claimed in claim 9, wherein the recess for the snap-in hook has an acute-angled tip, and the snap-in hook has an inner acute angle for latching behind said acute-angled tip.

11. The first cable holder as claimed in claim 8, wherein the latching arrangement comprises a guide for guiding said first and second latch elements into a latched state, the guide having an elongated protrusion running along an outer shell surface of the first housing shell and a corresponding elongated groove running around an outer shell surface of the second housing shell.

12. The first cable holder as claimed in claim 1, wherein the first connection element protrudes from the first housing shell and the second connection element is designed as a recess in the second housing shell.

13. The first cable holder as claimed in claim 1, wherein a slide direction of the linear-motion bearing is oriented at least substantially parallel to a rotation axis of the hinge.

14. The first cable holder as claimed in claim 1, wherein the first connection element has a first stop surface and the second connection element has a second stop surface to realize a mechanical end stop of the linear-motion bearing.

15. The first cable holder as claimed in claim 1, wherein the first connection element comprises a first snap coupling part and the second connection element comprises a corresponding second snap coupling part, such that the first connection element and the second connection element may establish a snap coupling with the respective counterpart.

16. A stack of a first cable holder and at least a second cable holder, each of said cable holders comprising:
a first housing shell;
a second housing shell;

a hinge connecting the first housing shell to the second housing shell being pivotable between an open position, in which a cable or a grommet can be inserted between the first and the second housing shell, and a closed position, in which the cable or the grommet is captively accommodated between the first and the second housing shell;

a first connection element for making connection to a second connection element of one of said respective other cable holders of said stack; and a second connection element for making connection to a first connection element of one of said respective other cable holders of said stack;

wherein the second connection element is at least substantially a negative shape of the first connection element such that the first connection element and the second connection element establish a linear-motion bearing with the respective counterpart, and wherein the first connection element is arranged on the first housing shell and the second connection element is located on the second housing shell, and wherein at least one of the first housing shell and the second housing shell has an elastic element for clamping the cable or the grommet in the first cable holder in the closed position, the elastic element being in direct contact with the cable or the grommet in the closed position, the elastic element being formed in one piece with at least one of the first housing shell and the second housing shell.

17. A fixation arrangement with a structural member, at least one first cable holder, and an attachment strap, the at least one first cable holder comprising:

a first housing shell;

a second housing shell;

a hinge connecting the first housing shell to the second housing shell being pivotable between an open position, in which a cable or a grommet can be inserted between the first and the second housing shell, and a closed position, in which the cable or the grommet is captively accommodated between the first and the second housing shell;

a first connection element for making connection to a second connection element of a second cable holder; and at least one attachment point or attachment slit for the attachment strap;

wherein the attachment strap is attached to the at least one first cable holder at the attachment point or attachment slit and attaches the at least one first cable holder to the structural member, and wherein the second connection element is at least substantially a negative shape of the first connection element such that the first connection element and the second connection element may establish a linear-motion bearing with the respective counterpart, and wherein at least one of the first housing shell and the second housing shell has an elastic element for clamping the cable or the grommet in the first cable holder in the closed position, the elastic element being in direct contact with the cable or the grommet in the closed position, the elastic element being formed in one piece with at least one of the first housing shell and the second housing shell.

* * * * *